April 19, 1966 P. J. TAMMINEN 3,247,024
GALVANIC BATTERY
Filed July 2, 1964 3 Sheets-Sheet 1

INVENTOR:
PENTTI J. TAMMINEN

BY Karl J. Ross
AGENT

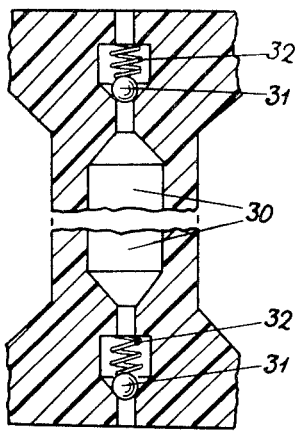
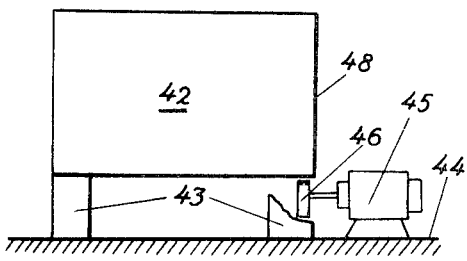
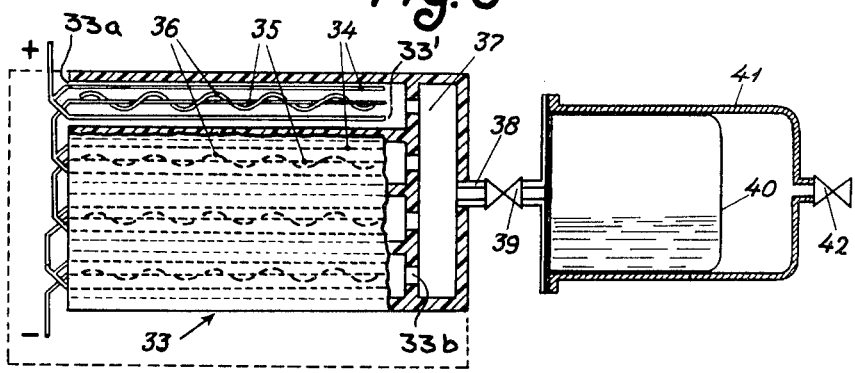
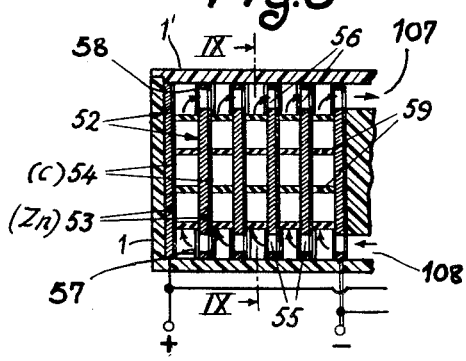
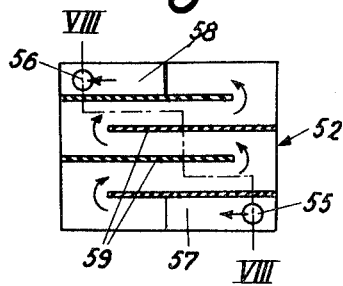
INVENTOR:
PENTTI J. TAMMINEN
BY
AGENT April 19, 1966 P. J. TAMMINEN 3,247,024
GALVANIC BATTERY Filed July 2, 1964 3 Sheets-Sheet 3

PENTTI J. TAMMINEN
INVENTOR.

BY Karl F. Ross
AGENT

3,247,024
GALVANIC BATTERY
Pentti Juuse Tamminen, Otaniemi, Otakallio 1.A.7, Helsinki, Finland
Filed July 2, 1964, Ser. No. 379,920
6 Claims. (Cl. 136—140)

My present invention relates to galvanic generators of electric current and, more particularly, to galvanic batteries of the type disclosed in my copending application Ser. No. 140,384, filed September 25, 1961, of which the present application is a continuation-in-part.

In the aforementioned copending application, I describe a liquid-electrolyte battery system in which the electrode efficiency can be markedly improved by the expedient of displacing one or more of the juxtaposed electrodes relatively to the body of electrolyte in contact therewith. As pointed out in this application, the improved electrode efficiency is believed to derive from the mechanical elimination of polarizing ions in the region of the active electrode surfaces by the promotion of turbulence in the electrolyte in contact therewith. More specifically, it should be mentioned that it is a common difficulty, in batteries operating with both liquid and semi-liquid electrolyte, for one or both of the electrodes to develop along its active surfaces a layer of ions which impede charging or discharging of the battery. It has, therefore, been proposed heretofore to provide batteries, in which polarization is a problem, with means for effecting at least limited relative displacement of the electrolyte and the active surfaces in contact therewith. In one conventional method, for example, gas bubbles are electrolytically generated in the electrode chamber or a separator chamber communicating therewith to entrain the electrolyte and thus displace it with respect to the galvanic-current-generating electrodes. Under certain circumstances, it has also been suggested to employ pumps and the like to displace electrolyte, for example through a plurality of apertures formed in the electrodes of one or both polarities, and thus circulate the electrolyte in contact with the electrode surfaces. In still another arrangement, generally plate-like electrodes are employed, with the electrolyte being passed through the interelectrode gap parallel to the active electrode surfaces. In all of these prior-art systems, however, the most effective results were only to be obtained by pumping the electrolyte at such high rates as to render the entire operation uneconomical. When reasonable electrolyte speed and volume flow rates were employed, there was a noticeable falling off of the electrode efficiency. In addition, these earlier techniques could not give the high electrode efficiency normally expected from depolarizer-type batteries, for example. Even with earlier circulation methods, there was a noticeable decrease in the terminal voltage of bateries especially when high-rate discharges were carried out as well as a measurable decline in the total discharge capacity of the system.

It is the principal object of the present invention to provide a galvanic electrical generator of the character described which is capable of delivering large currents without appreciable voltage declines for prolonged periods as compared with earlier galvanic batteries.

A corollary object of this invention resides in the provision of a galvanic battery having improved electrode efficiency and characterized by a substantial reduction in residual polarization at the electrode-electrolyte interfaces.

Still another object of this invention is to provide a battery having means for compensating variations in electrolyte temperature and composition in order to sustain a predetermined voltage level.

Another object of this invention is to provide an electrochemical generator of the character described having an improved electrode construction and configuration tending toward high output efficiencies.

Still a further object of this invention is to provide an improved method of operating liquid in electrolyte batteries and especially those galvanic generators in which free electrolyte is in contact with the electrode surfaces.

While it has been realized earlier, as mentioned above, that the movement of electrolyte with respect to the active electrode surfaces improves the efficiency of a battery by carrying away depleted electrolyte and any impurities which may have been found therein, there appears to have been little attention paid to the phenomenon of ionic contamination or polarization at the electrode-electrolyte interface. I have discovered that, in spite of earlier indications that polarization layers could be eliminated merely through circulation of an electrolyte with respect to the electrodes, mere movement of the electrolyte along the active surfaces of the electrode is insufficient to eliminate polarization layers proximal to the electrode surface and thus improve ionic diffusion between the electrodes to any considerable extent. In most instances, the total elimination of polarization layers adjacent the electrode has been prevented by disposing along one or both of the active electrode surfaces porous or semipermeable membranes or separator sheets which, if anything, reduce the effectiveness of electrolyte movement. In other situations, the flow of electrolyte along the active surfaces effectively prevents entrainment of the polarizing contaminants by virtue of the boundary layers formed in the laminar stream of electrolyte. A laminar flow between battery electrodes is, as is evident from Reynolds-number considerations, difficult to prevent and, in fact, results even when electrolyte is admitted between the electrodes through relatively narrow apertures. While the electrolyte stream in the region of such apertures may have some degree of turbulence, the major portion of the stream rapidly reverts to laminar flow with substantially stationary boundary layers of electrolyte liquid in contact with the active electrode surface. I have now discovered that to a large measure, the disadvantages of laminar flow under the aforementioned conditions can be reduced, if not entirely eliminated, by interrupting the straight-line flow of electrolyte with one or more electrolyte-deflecting means overlying an active electrode surface and extending at least partially transverse to the direction of flow of the electrolyte from an inlet to an outlet of the electrode chamber.

More specifically, it may be pointed out that the deflecting means, which, according to the present invention, overlies at most a minor fraction of the active surface so as not to impede ionic diffusion, promotes the entrainment of polarizing contaminants along this surface and insures substantially complete elimination of the waste products. The battery should, therefore, include at least one electrode chamber having an electrolyte inlet and an electrolyte outlet at generally longitudinally opposite sides of the active electrode surface, means being provided to effect relative displacement of the electrolyte and the surface in contact therewith. While it is preferred to forcibly drive the electrolyte through the electrode chamber and past the electrodes, thereby increasing the effectiveness of the turbulence-generating deflecting means mentioned above, it should be noted that the relative displacement can also be produced by reciprocating one or more of the electrodes in the electrode chamber by gross movement of the battery housing or casing or individual or joint movement of the electrodes with respect to the battery housing. In each case, however, the deflecting means acts in such manner as to prevent flow of the electrolyte in a straight line across the electrode and induce a turbulence sufficient to improve the efficiency of the battery to an extent such that the means for generating the turbulence can be powered by the battery itself without any power loss. The movement-producing means can, therefore, be electromagnetically operable and connected to the output terminals of the battery for energization thereby.

According to a more specific feature of the present invention, the galvanic generator is formed with housing means which may be integral or constituted by two separated sections forming at least one electrode chamber and an electrolyte reservoir along with a substantially closed electrolyte-circulation path from the reservoir and through the chamber. Along this path, there can be disposed displacement-pump means for circulating a stream of electrolyte through the chamber whose electrodes may consist of wires generally parallel to the direction of electrolyte flow. In this case a central electrode of one polarity can be surrounded by a plurality of parallel-connected electrodes of opposite polarity, with the deflecting means constituted by a relatively thin helical member wound around the central electrode and serving as the sole separator means along the juxtaposed length of the electrodes for maintaining the spacing therebetween. The helically wound separator can thus be coaxial with the central electrode and, according to an important feature of the present invention, should have a pitch substantially in excess of the width of the nonconductive separator member in the longitudinal direction so that the separator itself does constitute a barrier of any significant extent to the direct ionic path between electrodes. Alternatively, the electrodes can be constituted as stacked parallel plates with the deflecting means formed as thin bars separating the plates from one another and forming an undulating path for the electrolyte along the electrode surfaces.

This undulating path is, of course, similar in function to the vortex movement of the electrolyte created by the helical separator mentioned above. The bars should, of course, be spaced apart in the longitudinal direction and staggered to form the undulating path.

Batteries of the character described above have been found to be highly advantageous even when the electric current employed for the pump or vibrating means is extracted from the battery. In this connection, it may be noted that the pump motor can be energized by an external source until the battery voltage is sufficient to energize the motor, whereupon the external source can be automatically cut off by suitable voltage-responsive means and the motor connected across the battery terminals.

Under circumstances in which a propeller pump driven by an electromotor is used, the increase in the weight of the battery is about 5% while the delivered energy during high-rate discharge can be as much as 100% in excess of that absent the pump. The power consumption of the motor is only about 0.3%, a negligible amount compared with the resulting gain. The circulation of electrolyte, moreover, increases the use of the depolarizing substance and reduces the internal resistance of the battery, thereby diminishing the inherent voltage drop during discharge. The circulation of electrolyte, moreover, substantially increases the concentration of electrolyte which can be used, thereby further increasing the capacity of the generator.

The above and other objects, features and advantages of the present invention will become more readily apparent from the following description, reference being made to the accompanying drawing, in which:

FIG. 5 is an axial cross-sectional view through an electrode compartment of a modified battery, according to this invention, with the electrodes removed;

FIG. 6 is a cross-sectional view through another battery with a two-part housing;

FIG. 7 is a diagrammatic elevational view, partly broken away, showing means for vibrating the battery casing and suitable for use in conjunction with the embodiment of FIG. 1;

FIG. 8 is a fragmentary cross-sectional view of the electrode compartment of still another battery taken along the line VIII—VIII of FIG. 9, this compartment being adapted to be substituted for the electrode compartments of the battery of FIG. 1;

FIG. 9 is a cross-sectional view taken along the line IX—IX of FIG. 8; and

Figure 1:
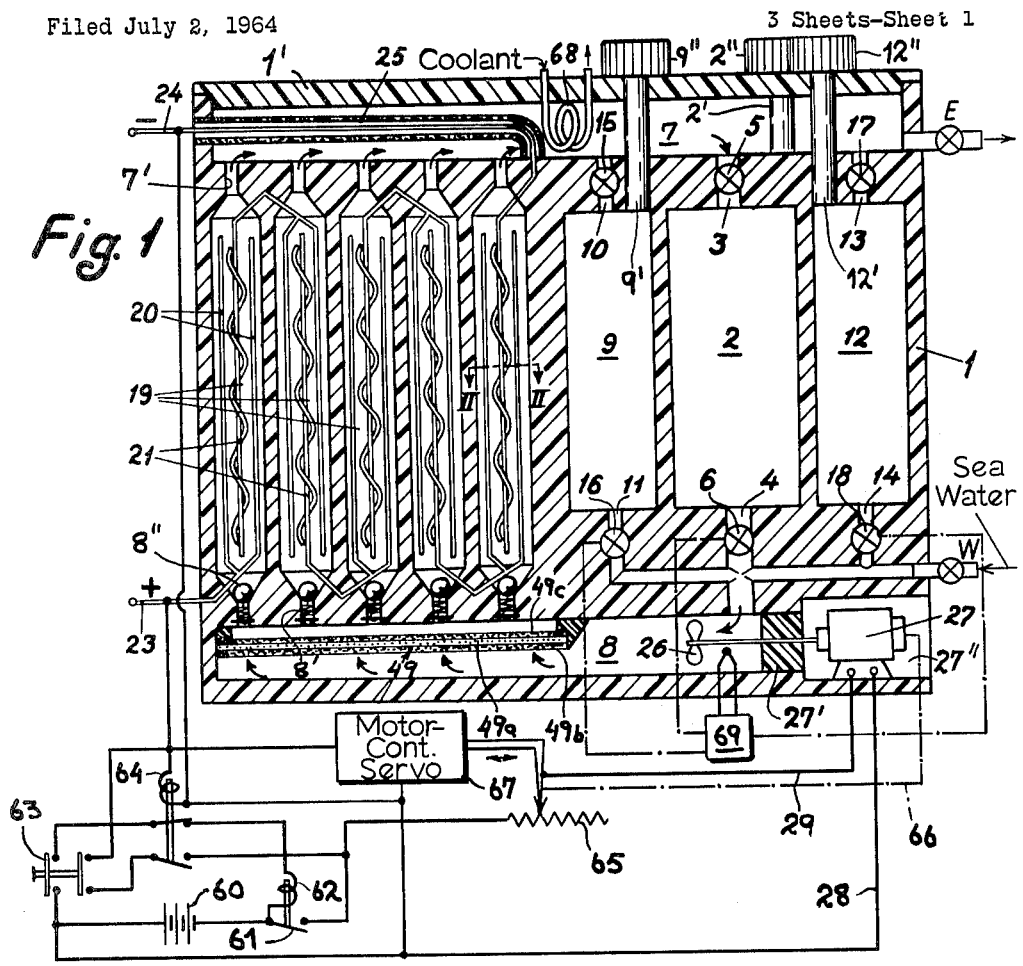
FIG. 1 is a vertical cross-sectional view through a galvanic generator embodying the present invention.

In FIG. 1, I show a sectional view of a battery whose casing 1 made of a suitable insulating material such as polyvinyl resin, an ABS resin, or a hard rubber has formed within it a plurality of electrode-containing cell chambers 19, these chambers having a cylindrical configuration with upright longitudinal axes. The electrode chambers communicate via narrow outlet and inlet passages 7', 8' with channels 7 and 8, respectively. Valves 8'' prevent entry of electrolyte into the chambers in the absence of a predetermined electrolyte pressure.

The channels 7, 8 serve to join the electrode chambers 19 to acid- and electrolyte-containing chambers 9, 2 and 12 via a series of ports and valves. The chamber 2 contains an electrolyte mixture of chromic acid, sulphuric acid and water, and is connected at one end to outlet channel 7 by means of a port 3 and a valve 5, whose operating member is shown at 5' in FIG. 10, and at the other end to inlet channel 8 by means of a port 4 and a valve 6, the latter being controlled by a handle 6'. Chamber 9, which contains chromic acid, and chamber 12, which contains sulphuric acid, are connected to channel 7 by port 10, valve 15, and port 13, valve 17, respectively; they are also connected to channel 8 by means of port 11, valve 16 and port 14, valve 18 respectively, the ports 11 and 14 communicating with port 4 forwardly of valve 6. Valves 15–17 are controlled by adjusting members 14' to 17' respectively.

In applications where water is readily available, as in connection with underwater devices, it is preferred to provide both the aqueous chromic-acid solution of reservoir 9 and the sulphuric acid of reservoir 12 in highly concentrated form, the sulphuric acid possibly even in the form of oleum ($H_2SO_4$ with dissolved $SO_3$). These solutions must be diluted before addition to the electrolyte. For this purpose the battery of FIG. 1 is provided with water pipe W through which the proper amount of water can be gradually fed to the battery. At the same time a minor part of the partly exhausted electrolyte, corresponding to the volume of additional water, is discarded through exhaust pipe E, which is preferably installed at the end of channel 7. This arrangement considerably improves the capacity of the battery, by increasing the amount of active electrolyte ingredients and by eliminating zinc ions and so improving the solubility of zinc electrodes.

Figure 4:
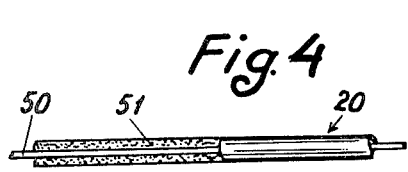
FIG. 4 is a partial cross-sectional view of a counterelectrode.
Figure 3:
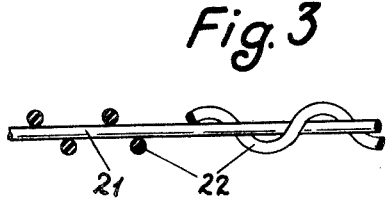
FIG. 3 is an elevational view of a central electrode of the type employed in the battery of FIG. 1 showing the helically wound separator, partly broken away.

For the sake of clarity, the electrode chambers 19 as shown in FIG. 1 contain only two positive electrodes 20 and one negative electrode 21, said negative electrode being provided with a helically wound dielectric separator 22 (e.g. a polystyrene filament), as shown in FIG. 3. The positive electrodes 20 each have a conducting core 50 of copper wire coated with a plastic material 51, which has been made conductive by impregnating it with small particles of carbonaceous material, such as graphite and acetylene black, as shown in FIG. 4. The negative electrode is a zinc wire. The positive electrodes of each cell, which are angularly spaced about the negative electrode, are interconnected in parallel and jointly connected in series with the negative electrode of an adjoining cell preferably in the same compartment.

Figure 2:
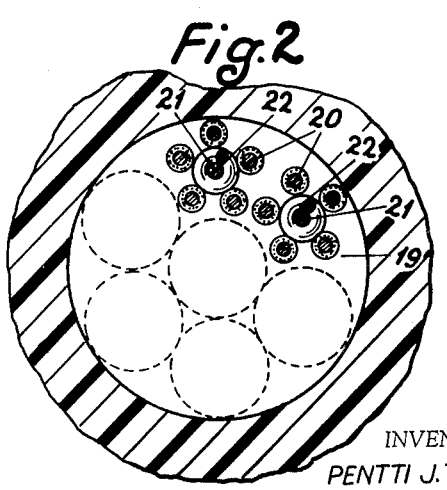
FIG. 2 is a cross-sectional view taken along the line II—II of FIG. 1.

As shown in FIG. 2, however, a plurality of electrode clusters constitute the cells and are contained within each of the electrode compartments 19, each cluster being provided with a plurality of positive electrodes 20 grouped about one negative electrode 21, the positive and negative electrodes 20, 21 being spaced from one another solely by the helical separator 22. The latter covers only a small fraction of the active electrode surface and generates a helical vortex upon circulation of electrolyte. Since the chambers 19 are almost completely filled with electrode clusters, only narrow passages are left for the electrolyte to flow through, and as the ratio of positive electrode surface area to negative electrode surface area is considerably larger than that of earlier batteries, the internal resistance of the battery is substantially reduced.

The oppositely poled electrodes of the battery cells are connected in series as previously indicated, the positive potential being brought out of the casing by a terminal 23 and the negative potential being brought out by a terminal 24; part of the lead for the latter terminal, extending from the center of the battery by way of channel 7, is covered with a tube of insulating material 25.

The circulation of the electrolyte through the battery chambers 19 is provided by a propeller pump 26 located in channel 8 and driven by an electric motor 27, isolated from the circulating electrolyte by a seal 27', and mounted in a recess 27" of the battery casing 1. The motor 27 is electrically connected to the battery terminals 23, 24 by conductors 28 and 29, via a control circuit. Feed tubes 2', 9' and 12', provided with respective closures 2", 9" and 12" in the cover 1' of the casing, serve to permit filling of the electrolyte reservoirs 2, 9 and 12, respectively.

To put the battery into operation, an external source of current 60 is applied to the motor 27, via relay contacts 61, upon energization of relay 62 by an on-off switch 63, while the valves 5 and 6 are opened, releasing the electrolyte from chamber 2 into channel 8, this channel being either empty or filled with inert distilled water prior to activation of the battery. As the electrolyte fills channel 8, it is driven by propeller pump 26 through a filter 49 provided for the removal of any solid particles of foreign matter which may be present in the electrolyte. The electrolyte then enters the chambers 19 by displacement of the valves 8", where it is forced through the narrow openings between the electrode clusters, the helical separators 22 creating strong turbulence of the electrolyte through the electrodes, thereby causing a thorough diffusion of active ions between electrodes. The electrolyte then leaves the chambers 19, taking with it the reaction products, and re-enters the cycle via channel 7.

As soon as the battery starts to generate a voltage, a voltage-responsive relay 64 is energized to inactivate external current source 60 driving the motor 27 and connects the battery voltage of terminals 23, 24 across said motor.

During discharge the electrolyte will slowly lose its activity. In order to keep the voltage stable, means may be provided for compensating lost activity of the electrolyte.

One method of re-activating the electrolyte is to incorporate in the filter 49 crystalline $CrO_3$, which activates the exhausted electrolyte as it is re-cycled. These activators 49a are disposed between fiber-glass layers 49b and 49c.

Another method of re-activating the electrolyte is to provide reservoirs, such as those shown in FIG. 1 at 9 and 12, filled respectively with concentrated chromic acid and concentrated sulfuric acid, which can be added to the electrolyte flow as needed by opening valves 15 and 16 of chamber 9 and valves 17 and 18 of chamber 12. By proper dimensioning of the ports 10, 11 of chamber 9 and 13, 14 of chamber 12 and/or the valves 15, 16 of chamber 9 and valves 17, 18 of chamber 12, it is possible to obtain an addition of sulfuric acid and chromic acid in substantially the same proportion as they are consumed in the reaction. If, additionally, the increase of zinc-ion concentration is held in check as indicated, by discarding partly exhausted electrolyte with simultaneous addition of water, the voltage of the battery will be kept stable over fairly extending periods.

Still another effective way of compensating for the loss of electrolyte activity as the battery is discharged is gradually to increase the speed of electrolyte flow, by providing the motor 27 with a potentiometer 65 which can be geared to the motor drive shaft as diagrammatically illustrated by dot-dash line 66 to increase the voltage to the motor at the same rate as the electrolyte is exhausted. Alternatively, or concurrently, the decrease in output voltage due to depletion of the electrolyte can be sensed by a servo 67, which drives the potentiometer to maintain the output voltage.

It has been discovered that an elevated electrolyte temperature between 50° C. and 80° C. is favorable for the best efficiency of a chromic-acid battery. Since the heat generated during the heavy discharge of these batteries may be quite strong, it may be advantageous to provide cooling means, such as a coil 68, in the circulation system in order to keep the temperature within the desired limits. If, on the other hand, the battery is intended for use under low temperature conditions, it will be desirable to provide for heating of the electrolyte in order quickly to obtain the full efficiency of the battery. Such heating may be effected in a convenient manner by mixing the concentrated sulfuric acid and a diluted solution of chromic acid from reservoirs 9 and 12 in accordance with the temperature as measured by a thermosensitive device 69 which can regulate valves 16 and 18. The mixing together of these acids will cause a rapid rise in the temperature of the resultant electrolyte to a value within the above-mentioned limits.

When applying the invention to storage batteries and primary batteries intended for intermittent use, it is preferable to close the open ends of the electrode-containing cells in order to prevent leakage currents during inactive periods. The best way to do this is to provide the cells with valves at both their open ends. Such an arrangement is illustrated in FIG. 5. An electrode-containing cell 30, similar to those shown in FIG. 1, is shown with its top and bottom passageways blocked by spring-loaded balls 31, acting as one-way valves. The springs 32 have a force-constant adapted to open the valves at a predetermined pressure of the electrolyte, caused by the pump, and to close them automatically when that pressure drops.

One material advantage of applying electrolyte flow in accordance with the invention in storage batteries is that it will be possible to charge these batteries with very high currents.

Batteries intended for very short discharge periods (high-rate discharges) may be designed in such a manner as to discard the electrolyte after it has flowed once through the cells, without recirculating it. FIG. 6 illustrates such an embodiment of the present invention. The elongated chambers 33' of battery 33 have a relatively small cross-sectional area, containing clustered electrodes 34 and 35, the electrodes 35 each carrying a helically wound separator 36 and being similar to the electrodes and separator shown in the embodiment of FIG. 1. The chambers 33' have one of their ends 33a open as an outlet to allow the electrolyte to be discarded after use, while the other ends 33b are inlets opening into a distributing channel 37. An electrolyte container 40, which is made of a collapsible material and protectively contained within a jacket 41, is connected to the distributing channel 37 through a conduit 38 and a pressure-responsive valve 39. The rigid jacket 41 also contains a pressure medium, such as a gas, and is provided with a valve 42 for introducing said medium into the jacket.

When activating the battery shown in FIG. 6, the valve 39 is opened and the pressure medium compresses the collapsible container 40, forcing the electrolyte through conduit 38 into distributing channel 37 and then through the chambers 33' where a vortex-type turbulence is produced in the electrolyte by the helical separators 36, the electrolyte being then expelled through the open ends of the cells.

In a battery of this type it is advantageous to use a highly active electrolyte whereby the speed of flow of the electrolyte may be reduced by adjusting the valve 39, thereby prolonging the discharge period.

It has been discovered that vibration has a favorable effect on the efficiency of the battery. This fact is believed to be due to the phenomenon that vibration causes turbulence adjacent the surface of the electrodes when the deflecting means previously described is employed. To make use of this phenomenon, the motor 27 of the embodiment shown in FIG. 1 may be provided with a slightly eccentric cam plate so as to cause vibration when running. In some cases, especially in batteries intended for very short discharge periods, it is possible to use only vibrations and omit the circulation system entirely, since the turbulence caused by the vibration alone will increase the activity of the battery to a sufficient degree. FIG. 7 schematically illustrates such an arrangement. A battery generally indicated at 42 and of the type illustrated in FIG. 1, is supported by pads 43 of an elastomeric material, such as rubber, these pads being secured to the battery and to a suitable base member 44. The base member 44 further carries an electric motor 45 whose shaft is provided with a cam plate 46 engaging the casing 48 of battery 42. When the motor 45 rotates, the cam plate 46 will cause the whole battery to vibrate. To increase the relative movement of the electrode and the electrolyte, the central electrode of each cluster, carrying the helical separator, can be resiliently mounted (e.g. by springs) and provided with a weight increasing the oscillation period of the electrode.

Figure 10:
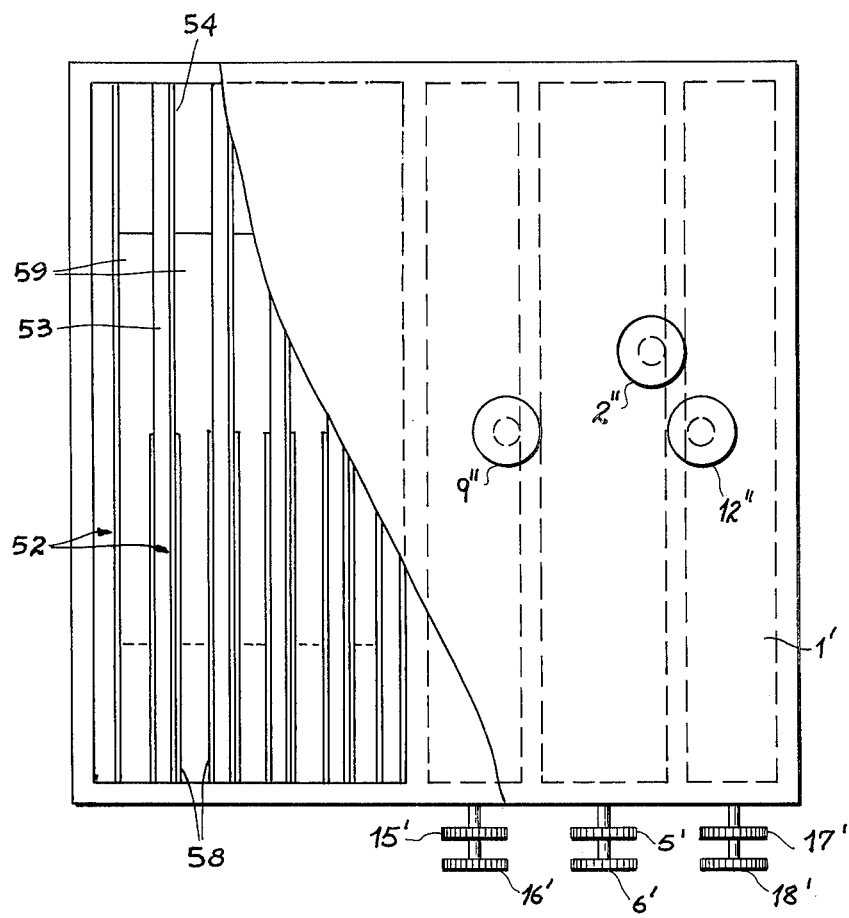
FIG. 10 is a top view of the battery of FIG. 8, showing valve-control means also seen in FIG. 1; and having part of the housing broken away to expose the plate structure of FIGS. 8 and 9.

The embodiment shown in FIGS. 8, 9, and 10 is intended for applications where a higher voltage is required. A plurality of parallel, spaced bipolar electrode plates 52 are formed by zinc plates 53 coated on one side with an inert conductive carbonaceous layer 54, advantageously having a rough corrugated or grooved surface. A plurality of parallel spaced insulating baffle bars 59, in a plane perpendicular to that of the electrode plates 52 and of a length somewhat less than that of the electrode plates 52, serve as separators for these electrodes and also provide a meandering path for the flow of electrolyte through the channels formed by the interrelationship of these baffle bars 59 and electrode plates 52. The electrode plates 53 are provided with openings 55, 56 along longitudinal opposite sides for the flow of electrolyte between plates, the area adjacent to the openings being covered on both sides by insulating layers 47, 58 (FIG. 9) to prevent short circuits. The flow of electrolyte can be generated by means already described in FIG. 1 (with inlet and outlet channels 108, 107 corresponding to channels 8 and 7 thereof), the flow becoming turbulent as it is forced around the baffles 59 and past the rough surface of coating 54, this surface also contributing to the turbulence.

The invention may of course also be applied to battery types using an electrolyte other than chromic acid. It may be necessary in some cases to divide the cells by a diaphragm and arrange two parallel, separate circulation systems. A so-called Bunsen battery is mentioned as an example of a battery having a diaphragm. In a Bunsen battery constructed in accordance with the invention, one circulation system would include sulfuric acid and zinc electrodes, and the other would include nitric acid and carbon electrodes. Both the positive and negative electrodes may in that case be provided with helically wound separators to cause a turbulent flow of electrolyte.

Depending upon the type of battery, it is, according to the invention, also possible to use an electrolyte comprising finely divided particles of a depolarizing material, such as manganese-dioxide crystals, and a conductive material, such as graphite, in order to enlarge the active depolarizing surface. In this case no filter is used, and the pump must be selected to meet the requirements of the high-density mixture.

I claim:
1. A galvanic battery comprising:
    housing means forming at least one electrode chamber and at lease one electrolyte reservoir communicating therewith;
    a set of substantially parallel electrode plates spacedly disposed in said chamber between opposite chamber walls for defining electrolyte compartments between them, said plates having confronting active surfaces of opposite polarity as boundaries for said compartments;
    means in said housing means forming a substantially closed electrolyte-circulation path from said reservoir to said chamber and thence back to said reservoir by way of said compartments;
    liquid displacement pump means along said path for circulating a stream of electrolyte through said compartments;
    and a set of relatively staggered insulating baffles extending substantially parallel and transversely within each compartment between the electrode plates thereof and holding same spaced apart, alternate baffles extending overlappingly from opposite chamber walls within the compartment for defining a meandering passage for said electrolyte.

2. A battery as defined in claim 1 wherein each plate interposed between a pair of adjoining compartments is a bipolar electrode with surfaces formed from conductive materials of different polarities respectively facing said adjoining compartments.

3. A battery as defined in claim 2 wherein said electrolyte is an aqueous solution of chromic acid and sulfuric acid, said bipolar electrodes each comprising a zinc sheet and a carbon layer disposed upon one surface of said sheet.

4. A battery as defined in claim 3 wherein said carbon layer is provided with a multiplicity of turbulence-promoting formations.

5. A battery as defined in claim 1 wherein said plates are substantially vertical and provided with a set of first perforations at a level below said baffles and with a set of second perforations at a level above said baffles, said path including an inlet channel communicating with one of said sets of perforations and an outlet channel communicating with the other of said sets of perforations.

6. A battery as defined in claim 5 wherein said plates are rectangular and said openings are disposed at diagonally opposite corners of said plates.

References Cited by the Examiner

UNITED STATES PATENTS

| | | | |
|---|---|---|---|
| 734,549 | 7/1903 | Halsey | 136—160 |
| 2,921,111 | 1/1960 | Crowley et al. | 136—160 |
| 2,936,327 | 5/1960 | Schrodt et al. | 136—162 |

FOREIGN PATENTS 15,257 1893 Great Britain.
18,886 1906 Great Britain.

WINSTON A. DOUGLAS, *Primary Examiner.*

JOHN H. MACK, *Examiner.*